United States Patent
Berry

(10) Patent No.: US 8,353,603 B2
(45) Date of Patent: Jan. 15, 2013

(54) PET ITEM STORAGE UNIT

(75) Inventor: Erika Berry, Ada, MI (US)

(73) Assignee: Berryco LLC, Ada, MI (US)

(*) Notice: Subject to any disclaimer, the term of this patent is extended or adjusted under 35 U.S.C. 154(b) by 657 days.

(21) Appl. No.: 12/559,195

(22) Filed: Sep. 14, 2009

(65) Prior Publication Data

US 2010/0006576 A1    Jan. 14, 2010

Related U.S. Application Data

(63) Continuation-in-part of application No. 11/969,441, filed on Jan. 4, 2008, now abandoned.

(51) Int. Cl.
    *F21V 33/00* (2006.01)
(52) U.S. Cl. ............... 362/154; 362/108; 362/253
(58) Field of Classification Search ............. 362/103, 362/108, 154, 196, 253; 119/858, 859
    See application file for complete search history.

(56) References Cited

U.S. PATENT DOCUMENTS

| | | | |
|---|---|---|---|
| 5,067,063 A * | 11/1991 | Granneman et al. | 362/154 |
| 5,361,726 A * | 11/1994 | Harris et al. | 119/859 |
| 5,363,809 A | 11/1994 | Roe | |
| 5,441,017 A | 8/1995 | Lindsay | |
| 5,560,321 A | 10/1996 | Hess | |
| 5,727,500 A | 3/1998 | Conboy | |
| 5,819,691 A | 10/1998 | Lavi et al. | |
| 6,019,067 A | 2/2000 | Carey | |
| 6,035,809 A | 3/2000 | Fingerett et al. | |
| 6,073,590 A | 6/2000 | Polding | |
| 6,085,695 A | 7/2000 | Miller et al. | |
| 6,223,695 B1 | 5/2001 | Edwards et al. | |
| 6,418,881 B1 | 7/2002 | Starratt | |
| 6,588,375 B2 | 7/2003 | Benedettini | |
| 7,073,462 B1 * | 7/2006 | Layman | 119/859 |
| 7,194,982 B2 | 3/2007 | Edwards | |
| 2002/0096895 A1 | 7/2002 | McCarthy | |
| 2003/0009516 A1 * | 1/2003 | McGillivray et al. | 294/203 |
| 2009/0255486 A1 * | 10/2009 | Thompson et al. | 119/859 |

* cited by examiner

*Primary Examiner* — Y My Quach Lee
(74) *Attorney, Agent, or Firm* — Price Heneveld LLP

(57) ABSTRACT

A pet item storage unit including a body having first and second portions. The first portion includes a first storage compartment having a lid adapted to secure items inside the first storage compartment. The second portion includes a second storage compartment adapted to hold a plurality of disposable bags and includes an open slot for removal of at least one of the bags. An aperture extends completely through the pet item storage unit between the first and second portions and is adapted to receive a dog leash. A light source is disposed between the first and second portions.

14 Claims, 5 Drawing Sheets

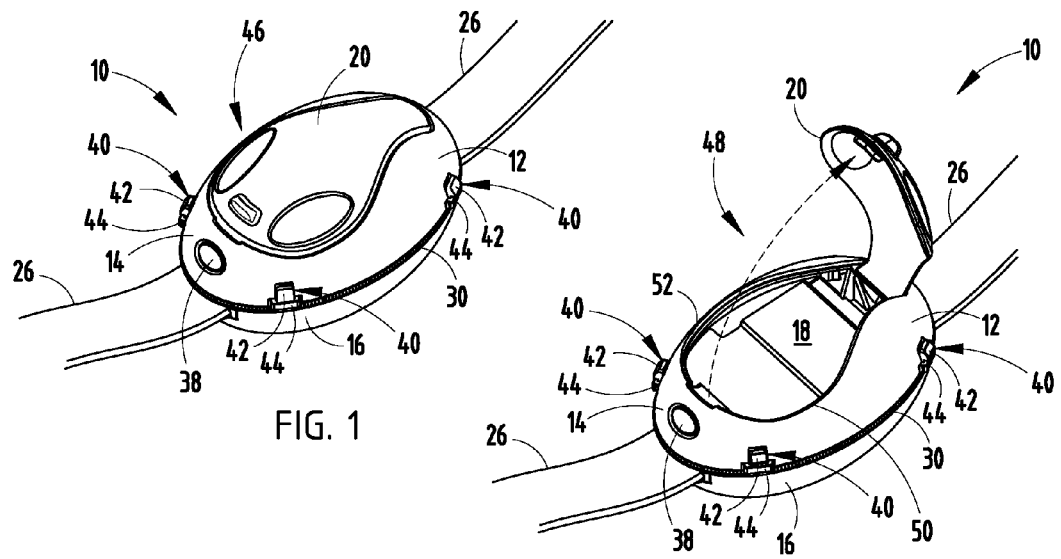
FIG. 1
FIG. 2
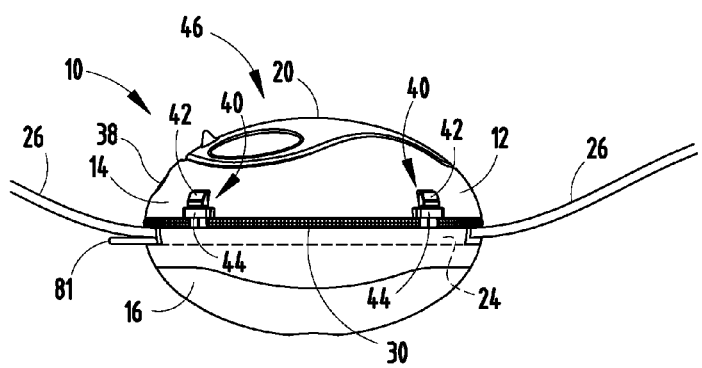
FIG. 3
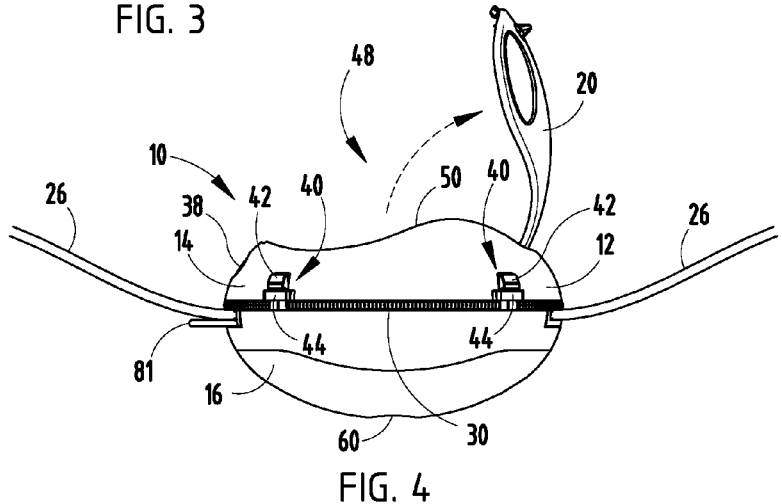
FIG. 4

PET ITEM STORAGE UNIT

CROSS-REFERENCE TO RELATED APPLICATIONS

This application is a continuation-in-part of and claims priority to U.S. patent application Ser. No. 11/969,441, entitled "DOG LEASH CONTAINER," filed on Jan. 4, 2008, now abandoned, the entire disclosure of which is hereby incorporated herein by reference.

BACKGROUND OF THE INVENTION

In non-rural areas, it is common for pet owners to carry bags for picking up and disposing of pet feces in common areas. However, the bags are often cumbersome to carry, can be forgotten, and can become damaged if not stored properly.

Accordingly, a container adapted for carrying bags for disposal of pet feces, and other accessories, would be beneficial.

SUMMARY OF THE INVENTION

In one aspect of the present invention, a pet item storage unit including a body having first and second portions. The first portion includes a first storage compartment having a lid adapted to secure items inside the first storage compartment. The second portion includes a second storage compartment adapted to hold a plurality of disposable bags and includes an open slot for removal of at least one of the bags. An aperture extends completely through the pet item storage unit between the first and second portions and is adapted to receive a dog leash. A light source is disposed between the first and second portions.

In another aspect of the present invention, a pet item storage unit for connection with a pet leash includes a first portion having a first compartment. A first portion includes a lid operable between open and closed positions over a first storage compartment. A second portion includes a second compartment having an at least partially flexible portion with a slot disposed therethrough and being removably connected with the first portion. A light source is disposed in the storage compartment. The light source is operably connected with a switch.

In yet another aspect of the present invention, a method of making a pet item storage unit includes forming a first storage compartment. A second storage compartment is formed. The first storage compartment is connected with the second storage compartment. A cover is placed over the first storage compartment that is operable between open and closed positions. A cover is placed over the second storage compartment that includes a slot for removing disposable bags disposed in the second storage compartment. An aperture is formed between the first storage compartment and the second storage compartment adapted to receive a leash.

These and other features, advantages and objects of the present invention will be further understood and appreciated by those skilled in the art upon studying the following specification, claims, and appended drawings.

BRIEF DESCRIPTION OF THE DRAWINGS

FIG. 1 is a top perspective view of one embodiment of a pet item storage unit;

FIG. 2 is a top perspective view of the pet item storage unit of FIG. 1 with the lid open;

FIG. 3 is a side elevational view of the pet item storage unit of FIG. 1;

FIG. 4 is a side elevational view of the pet item storage unit of FIG. 3 with the lid open;

DETAILED DESCRIPTION OF EMBODIMENTS

For purposes of description, herein, the terms "upper," "lower," "right," "left," "rear," "front," "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 11:
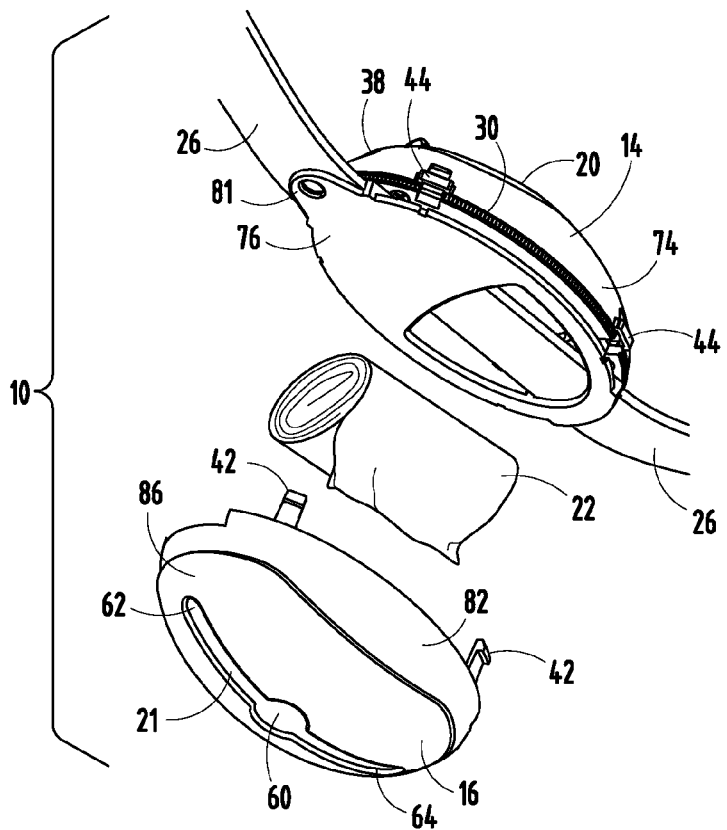
FIG. 11 is a bottom perspective exploded view of a pet item storage unit according to the present invention.
Figure 12:
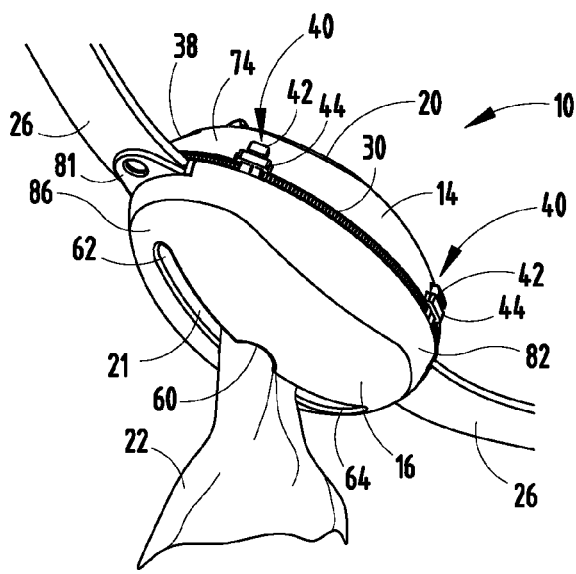
FIG. 12 is a bottom perspective view of the pet item storage unit of FIG. 11.
Figure 13:
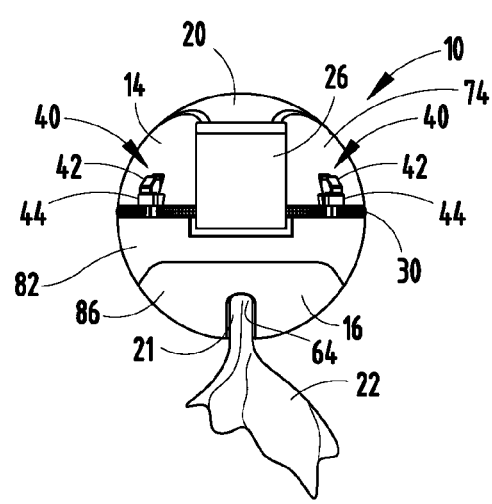
FIG. 13 is a rear elevational view of the pet item storage unit of FIG. 11.
Figure 14:
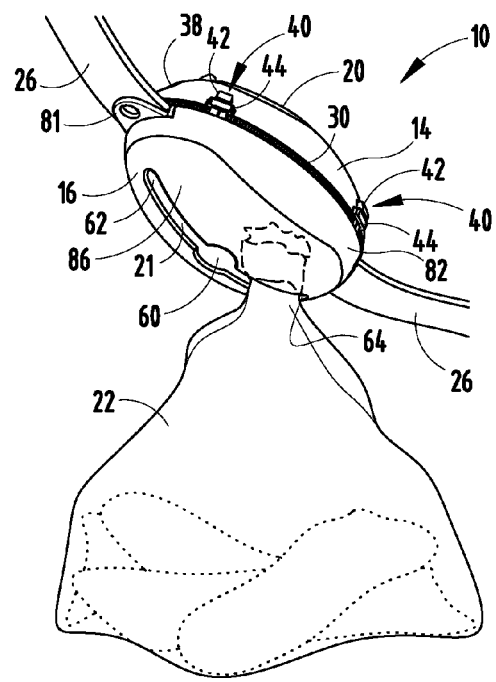
FIG. 14 is a bottom perspective view of one embodiment of a pet item storage unit of FIG. 11.
Figure 15:
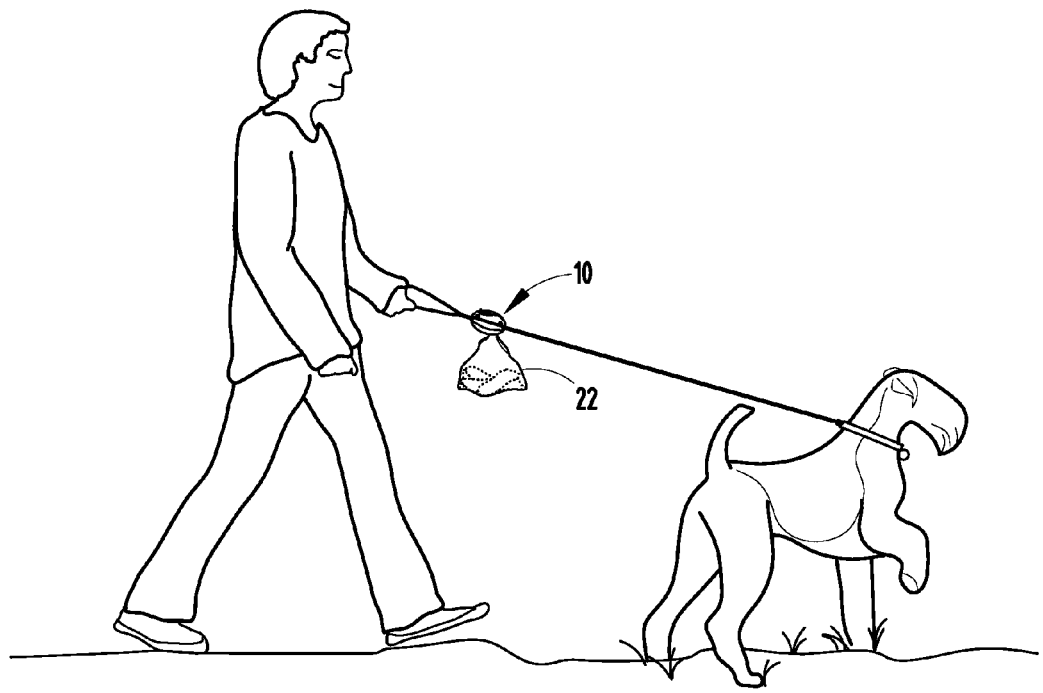
FIG. 15 is a side perspective view of an embodiment of the pet item storage unit of the present invention during use.

The reference numeral 10 shown in the illustrated embodiment of FIG. 1 generally designates a pet item storage unit including a body 12 having first and second portions 14, 16. The first portion 14 includes a first storage compartment 18 (FIG. 2) having a lid 20 adapted to secure items inside the first storage compartment 18. The second portion 16 includes a second storage compartment 21 (FIG. 6) adapted to hold a plurality of disposable bags 22 (FIG. 11) and includes an open slot 23 (FIG. 8) for removal of at least one of the bags 22. An aperture 24 extends completely through the pet item storage unit 10 between the first and second portions 14, 16 and is adapted to receive a dog leash 26. A light source 28 (FIG. 9) is disposed between the first and second portions 14, 16.

Referring again to FIG. 1, the illustrated embodiment includes a light plate 30 that refracts light outward from an internal light element. The light plate 30 is disposed between the first and second portions 14, 16 of the pet item storage unit 10 and is adjacent to the aperture 24. The light plate 30 is powered by a battery pack that is operably connected with the light source 28. A switch 38 is disposed on the first portion 14 and is operably connected with the battery pack to activate and deactivate the light source 28.

Referring now to FIGS. 1-4, the first and second portions 14, 16 are connected by a plurality of external engagement clips 40 that secure the first portion 14 to the second portion 16. The external engagement clips 40 include a male extension 42 and a female receiver 44, although other configurations, as are understood by one having ordinary skill in the art, may also be utilized. The lid 20 is disposed on and hingedly connected to the first portion 14 and operable between a closed position 46 (FIG. 1) and an open position 48 (FIG. 2). The lid 20 covers an access opening 50 adjacent the first storage compartment 18. The first storage compartment 18 may be a dry compartment or a wet compartment with a sealing ring 52 disposed about the perimeter of the lid 20 or the access opening 50 disposed in the second portion 16 of the pet item storage unit 10.

Figure 5:
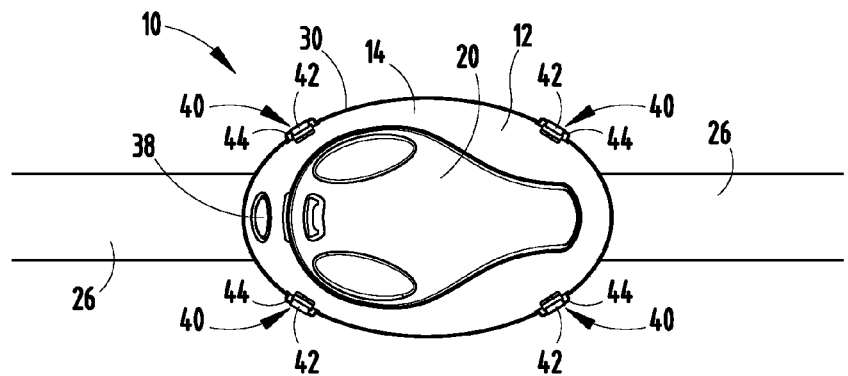
FIG. 5 is a top plan view of the pet item storage unit of FIG. 1.
Figure 6:
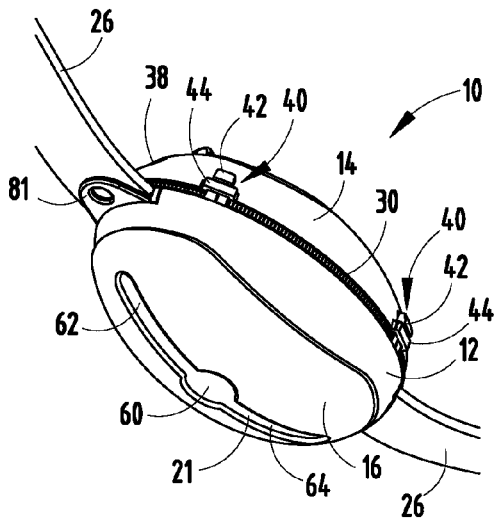
FIG. 6 is a bottom perspective view of the pet item storage unit of FIG. 1.

Referring now to FIGS. 5 and 6, the bag removal slot 23 is disposed in the second portion 16 of the pet item storage unit 10. The bag removal slot 23 has an elongate configuration with a centrally disposed circular opening 60 and first and second distal ends 62, 64. The second storage compartment 21 in the second portion 16 is designed to hold a plurality of disposable bags 22 adapted to hold animal waste. To use the pet item storage unit 10, the user simply snaps the first and second portions 14, 16 together over the leash 26, with the leash 26 positioned in the aperture 24, and the open slot 23 facing downward. The second storage compartment 21 is filled with bags 22. After an animal has relieved itself, a bag 22 is removed from the second storage compartment 21 and the animal waste is collected. It is conceived that the material adjacent to the open slot 23 may be comprised of a pliable flexible material that is deformable and allows a user easy access to the second storage compartment 21 and accordingly the bags 22.

Figure 7:
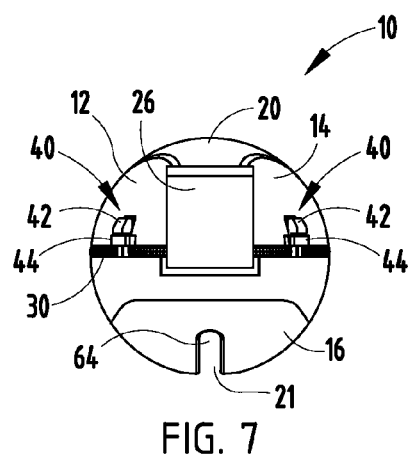
FIG. 7 is a rear elevational view of the pet item storage unit of FIG. 1.
Figure 8:
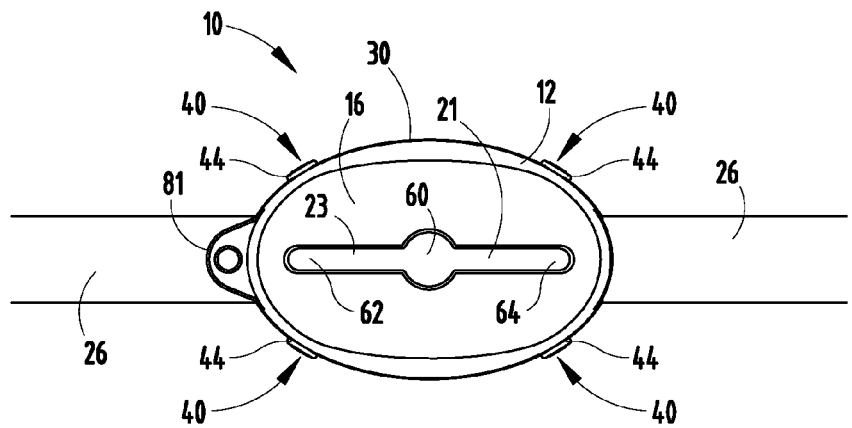
FIG. 8 is a bottom plan view of the pet item storage unit of FIG. 1.
Figure 9:
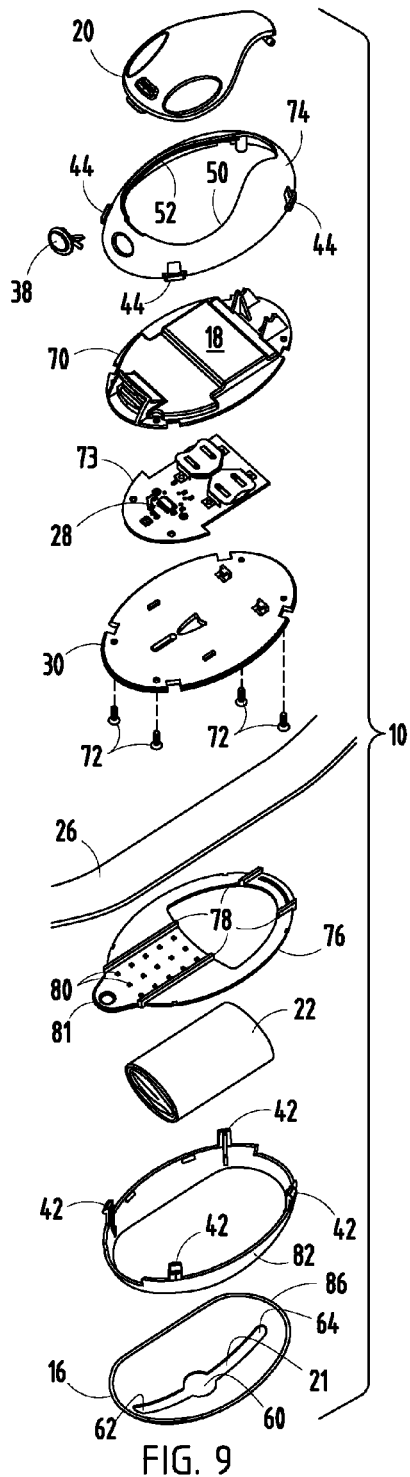
FIG. 9 is a top perspective exploded view of a pet item storage unit according to the present invention.
Figure 10:
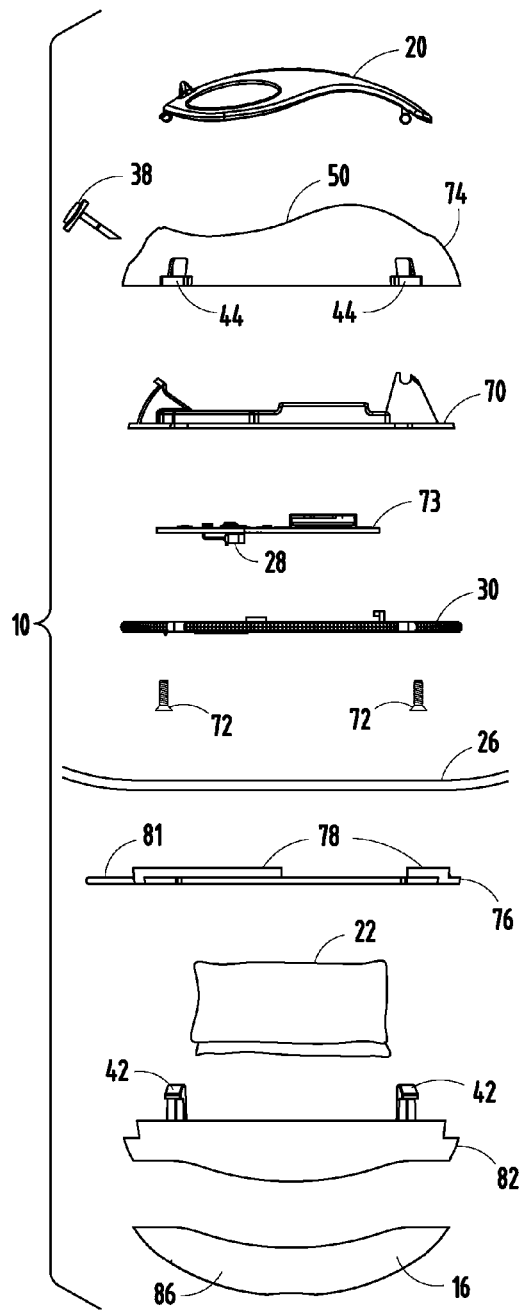
FIG. 10 is a side elevational exploded view of a pet item storage unit according to the present invention.

Referring now to FIGS. 7 and 8, the first portion 14 includes a base 70 (FIG. 9) that extends over the light source 28 and is attached therewith by a plurality of mechanical fasteners 72. A circuit board 73 (FIG. 9) is disposed between the light source 28 and the base 70 and is operably connected with the switch 38 to facilitate operation of the light source 28 between an on condition and an off condition. A first housing 74 (FIG. 9) is disposed above the base 70 and is connected therewith by the same mechanical fasteners 72 that secure the light source 28 to the base 70. The lid 20 is hingedly connected to the base 70, although it is conceived that the lid 20 could be connected to the first housing 74 in a variety of different manners. The second portion 16 includes an undercarriage 76 (FIG. 9) having upwardly extending flanges 78 and a plurality of pointed protuberances 80 (FIG. 9) that are designed to frictionally engage the dog leash 26 received in the aperture 24. A carabiner hole 81 extends from the undercarriage 76. The upwardly extending flanges form part of the aperture 24, as does a bottom surface of the light plate 30. A second housing 82 (FIG. 9) is connected to the undercarriage 76. Male extensions 44 extend from the second housing 82. A plurality of bags 22 are disposed in the second housing 82 and a pliable cover 86 (FIG. 9) is disposed over the second housing 82 securing the bags 22 inside the second housing 82. The pliable cover 86 includes the open slot 23, as discussed in detail above.

In yet another aspect of the present invention, a method of making the pet item storage unit 10 includes forming the first storage compartment 18. The second storage compartment 21 is formed. The first storage compartment 18 is connected with the second storage compartment 21. The cover 86 is placed over the first storage compartment 18 that is operable between the closed position 46 and the open position 48. The cover 86 is placed over the second storage compartment 21 that includes the slot 23 for removing the disposable bags 22 disposed in the second storage compartment 21. The aperture 24 is formed between the first storage compartment 18 and the second storage compartment 21 adapted to receive the leash 26.

After animal waste has been collected by a user in one of the bags 22, but prior to disposal, a user can make a knot in the bag 22 and insert the knot into the centrally disposed circular opening 60 in the elongated slot and slide the knot toward one of the first and second distal ends 62, 64 of the slot to secure the waste in a position below the pet item storage unit 10 and dog leash 26. In this manner, multiple bags 22 carrying animal waste may be connected with the pet item storage unit 10.

It is conceived that different kinds of bags 22 could be utilized, including, but not limited to, recycled plastic bags, and specially designed bags for holding animal waste.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A pet item storage unit, comprising:
    a body having a first portion removably coupled to a second portion, the first portion including a first storage compartment having a lid adapted to secure items inside the first storage compartment, and the second portion including a second storage compartment adapted to hold a plurality of disposable bags and including an open slot for removal of at least one of the bags;
    an aperture that extends completely through the pet item storage unit between the first and second portions and which is adapted to receive a dog leash; and
    a light source in the form of a late that is disposed between the first and second portion that disperses light outward about a circumference of the body.

2. The pet item storage unit of claim 1, wherein a switch is disposed on one of the first and second portions, the switch being in operable connection with the light source.

3. The pet item storage unit of claim 1, further comprising: a plurality of external engagement clips.

4. The pet item storage unit of claim 1, wherein the open slot includes an elongated configuration with a predetermined width and a widened hole having a diameter greater than the predetermined width.

5. The pet item storage unit of claim 1, further comprising:
    a plurality of protuberances disposed inside the aperture and adapted to frictionally engage a dog leash received therein.

6. The pet item storage unit of claim 1, further comprising:
    a carabiner hole extending from the pet item storage unit.

7. A pet item storage unit for connection with a pet leash, comprising:
    a first portion including a lid operable between open and closed positions over a first storage compartment;
    a second portion including a second compartment having an at least partially flexible portion with a slot, wherein the first portion is removably coupled to the second portion by external engagement clips, and wherein the first portion and the second portion define an aperture that extends completely through the pet item storage unit from a first side to a second side; and
    a light source disposed in the storage compartment, the light source being operably connected with a switch.

8. The pet item storage unit of claim 7, wherein the light source includes a light plate disposed between the first and second portions adjacent the aperture.

9. The pet item storage unit of claim 7, wherein a switch is disposed on one of the first and second portions, the switch being in operable connection with the light source.

10. The pet item storage unit of claim 7, further comprising:
a plurality of external engagement clips.

11. The pet item storage unit of claim 10, wherein the open slot includes an elongated configuration with a predetermined width and a widened hole having a diameter greater than the predetermined width.

12. The pet item storage unit of claim 7, further comprising:
a plurality of protuberances disposed inside the aperture and adapted to frictionally engage a dog leash received therein.

13. The pet item storage unit of claim 7, further comprising:
a carabiner hole extending from the pet item storage unit.

14. A method of making a pet item storage unit comprising:
forming a first storage compartment;
forming a second storage compartment;
connecting the first storage compartment with the second storage compartment;
positioning a light plate between the first storage compartment and the second storage compartment such that the light plate externally disperses light around a circumference of the first storage compartment and the second storage compartment;
placing a cover over the first storage compartment that is operable between open and closed positions;
placing a cover over the second storage compartment that includes a slot for removing disposable bags disposed in the second storage compartment; and
forming an aperture between the first storage compartment and the second storage compartment adapted to receive a leash.

* * * * *

UNITED STATES PATENT AND TRADEMARK OFFICE
CERTIFICATE OF CORRECTION

PATENT NO. : 8,353,603 B2  
APPLICATION NO. : 12/559195  
DATED : January 15, 2013  
INVENTOR(S) : Erika Berry It is certified that error appears in the above-identified patent and that said Letters Patent is hereby corrected as shown below:

In the Claims

Column 4, Claim 1, Line 37,

"late" should be -- light plate --

Signed and Sealed this
Third Day of June, 2014

Michelle K. Lee
*Deputy Director of the United States Patent and Trademark Office*